United States Patent

Murayama

[11] Patent Number: 5,839,477
[45] Date of Patent: Nov. 24, 1998

[54] CORRUGATED RESIN PIPE

[75] Inventor: Teluo Murayama, Osaka, Japan

[73] Assignee: Totaku Industries, Inc., Osaka, Japan

[21] Appl. No.: 838,538

[22] Filed: Apr. 9, 1997

[30] Foreign Application Priority Data

Apr. 10, 1996 [JP] Japan .................................. 8-114173

[51] Int. Cl.$^6$ .................................................. F16L 11/00
[52] U.S. Cl. ........................ 138/121; 138/122; 138/155; 138/120; 138/177
[58] Field of Search .................................... 138/121, 122, 138/120, 155, 177, 111, 114, 115, 116

[56] References Cited

U.S. PATENT DOCUMENTS

| 2,146,352 | 2/1939 | Rohrer ................................. 138/155 X |
| 2,206,286 | 7/1940 | Karmazin ............................. 138/155 X |
| 2,563,578 | 8/1951 | Candee . | |
| 3,693,664 | 9/1972 | Schmunk ............................. 138/155 X |
| 4,275,771 | 6/1981 | Campbell, Jr. ....................... 138/155 X |
| 4,560,320 | 12/1985 | Baus ................................... 138/155 X |
| 4,662,734 | 5/1987 | Nishi .................................... 138/121 |
| 4,790,975 | 12/1988 | Jarvenkyla et al. ................ 138/121 X |
| 5,120,083 | 6/1992 | Stine . | |
| 5,429,397 | 7/1995 | Kano .................................. 138/121 X |

FOREIGN PATENT DOCUMENTS

| 2386767 | 4/1978 | France . |
| 432158 | 3/1967 | Germany . |

OTHER PUBLICATIONS

Copending Application Serial No. 08/600,595 Filed on Feb. 13, 1996, Now Allowed. (Copy of Specification as Filed Enclosed).

Primary Examiner—Patrick F. Brinson
Attorney, Agent, or Firm—Whitham, Curtis & Whitam

[57] ABSTRACT

The external shape of a pipe wall is formed of sectionally rectangular wall portions and sectionally circular wall portions which are disposed alternately in an axial direction of the pipe, and the internal shape of the pipe wall is formed into a substantially linear circular-cylindrical surface. The whole of the pipe wall is formed of a material of synthetic resin or rubber.

24 Claims, 8 Drawing Sheets

CORRUGATED RESIN PIPE

BACKGROUND OF THE INVENTION

The present invention relates to corrugated resin pipes which are buried in the ground, or subjected to piping inside or outside a building on the ground, or in the outdoors such as under a bridge, an overhead railroad, or the like, and which are mainly suitable to be used as liquid pipe lines.

Heretofore, a corrugated resin pipe the pipe wall of which is formed into an annularly or spirally corrugated shape is well known broadly. Such corrugated resin pipes have been used broadly in water pipes, sewage pipes, and other fields. All these general corrugated resin pipes, the pipe walls of which are annularly corrugated or spirally corrugated, have circular shapes.

However, these conventional corrugated pipes, which are circular as a whole, have some problems that the stability is poor in piping, that keeping the parallelism is difficult when the pipes are subjected to piping in parallel with each other, that, particularly when the pipes are subjected to piping in the ground, earth and sand enter the space between the pipes so that the linearity is apt to be disturbed, and that when cables such as electric wires, telephone lines or the like are inserted into the pipes used as cable protecting tubes, the wiring resistance in inserting the cables is large to make the insertion working difficult if the pipes are subjected to piping not straight.

SUMMARY OF THE INVENTION

Taking the foregoing problems belonging to the conventional circular corrugated pipes into consideration, an object of the present invention is to provide a corrugated resin pipe having a special structure in which these problems belonging to conventional circular corrugated pipes can be solved, and in which the flattening pressure resistance similar to or more than that of the conventional circular corrugated pipes is provided even if the pipe is formed of only synthetic resin material or rubber material.

In order to solve the above problems, according to the present invention, there is provided a corrugated resin pipe comprising a pipe wall having an external shape and an inner shape, the external shape being formed of wall portions rectangular in section and wall portions circular in section which are disposed alternately in an axial direction of the pipe, the internal shape being formed into a substantially linear circular-cylindrical surface, the whole of the pipe wall being formed of a material of synthetic resin or rubber.

The present invention can be carried out with a structure wherein the pipe wall has an external shape and an inner shape, the external shape having an outer pipe formed of wall portions rectangular in section and wall portions circular in section which are disposed alternately in an axial direction of the pipe, the internal shape having a inner pipe formed into a substantially linear circular-cylindrical surface, the inner pipe being formed in the inside of the outer pipe so as to be integrally connected to the outer pipe.

In addition, the present invention can be carried out with a structure wherein, in the outer circumferential surface of a the pipe wall, the outer circumferential diameter of each of the sectionally circular wall portions is formed to be a little smaller than the center portion of a flat side of each of the sectionally rectangular wall portions, or these two portions are formed so as to be substantially even in surface to each other, or in the inner circumferential surface of the outer pipe, the center portion of the flat side of each of the sectionally rectangular wall portions is formed so as to be substantially even to the inner circumferential surface of corresponding one of the sectionally circular wall portions adjacent to the former portion, or in this portion, the sectionally circular wall portions are formed so as to project on the inner circumferential surface side of the pipe in comparison with the sectionally rectangular wall portions.

The sectional shape of each of the sectionally rectangular wall portions stated herein is not limited to an angular rectangle, but may be a rectangle the corner portions of which are arcuate. The rectangle is not limited to a square, but may be made to be a long-rectangle which is long vertically or horizontally. In addition, the sectional shape of each of the sectionally circular wall portions is not limited to a true circle, but may be an ellipse or an oval.

In carrying out the embodiment, polyethylene, polyvinyl chloride, polypropylene, other desired synthetic resin materials can be selectively used as the synthetic resin material forming the pipe wall. Further, natural rubber, synthetic rubber and so on may be selectively used as the rubber material. In addition, in the case where the pipe is constituted by an outer pipe and an inner pipe, the present invention can be carried out in combination of desired materials so that the outer pipe is formed of synthetic resin material superior in weatherability while the inner pipe is formed of, for example, rubber material superior in chemical resistance, or the outer pipe is made of hard material superior in flattening pressure resistance while the inner pipe is made of soft material.

In a corrugated resin pipe with such a structure according to the present invention, the sectionally rectangular wall portions of the pipe wall are rectangular in section, so that the pipe can be subjected to piping stably by the existence of desired flat sides of the sectionally rectangular wall portions not only when the pipe is buried and subjected to piping in the ground but also when it is subjected to piping in any place. Accordingly, it is possible to position the pipe easily, and the position is not shifted easily after the pipe is subjected to piping, so that it is easy to keep the posture of the pipe arrangement.

DETAILED DESCRIPTION OF THE INVENTION

Figure 1:
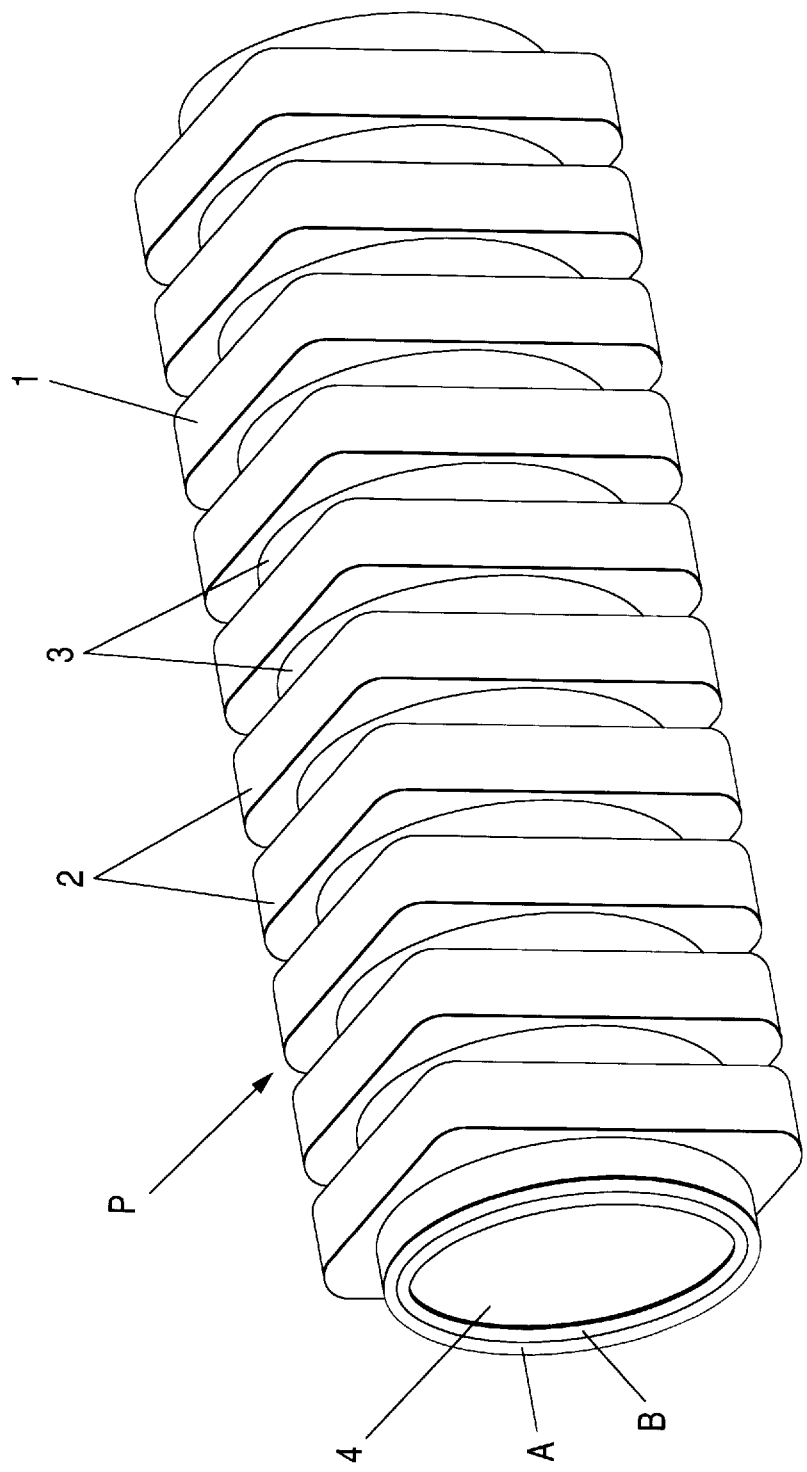
FIG. 1 is a perspective-view of a pipe showing a first embodiment.
Figure 2:
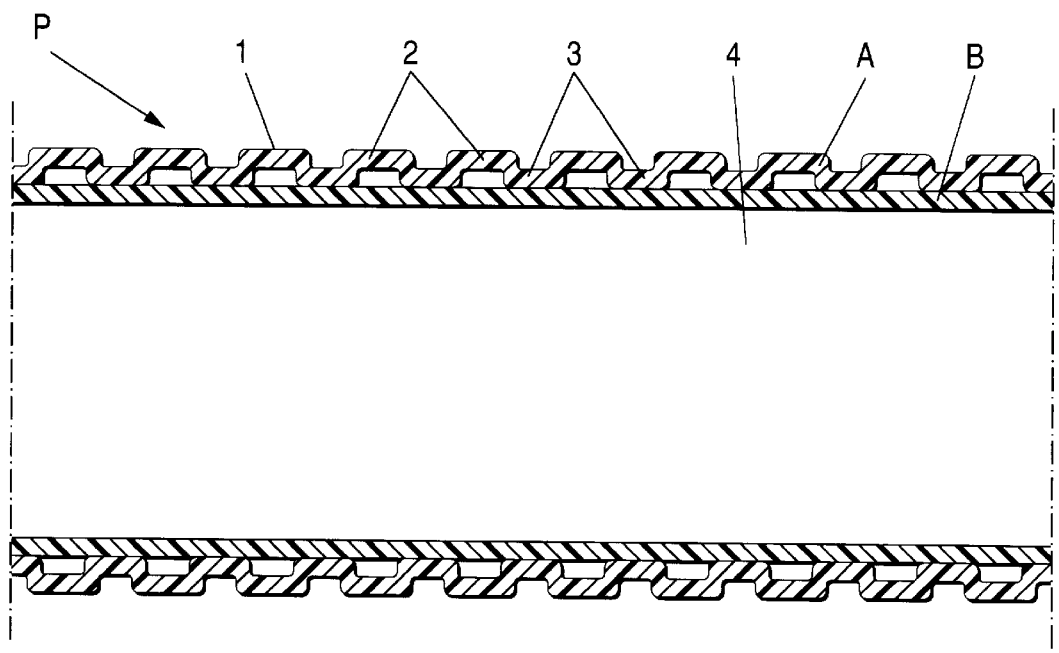
FIG. 2 is a vertical sectional view of the pipe of FIG. 1 along the axial direction thereof.
Figure 3:
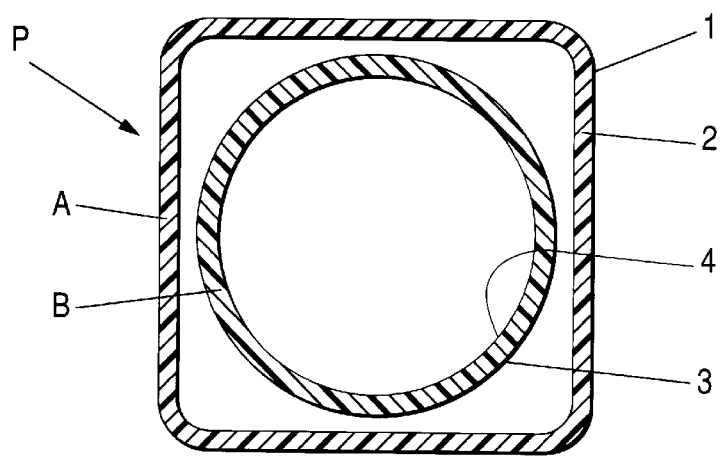
FIG. 3 is a vertical sectional view of a sectionally rectangular wall portion of the pipe of FIG. 1.
Figure 4:
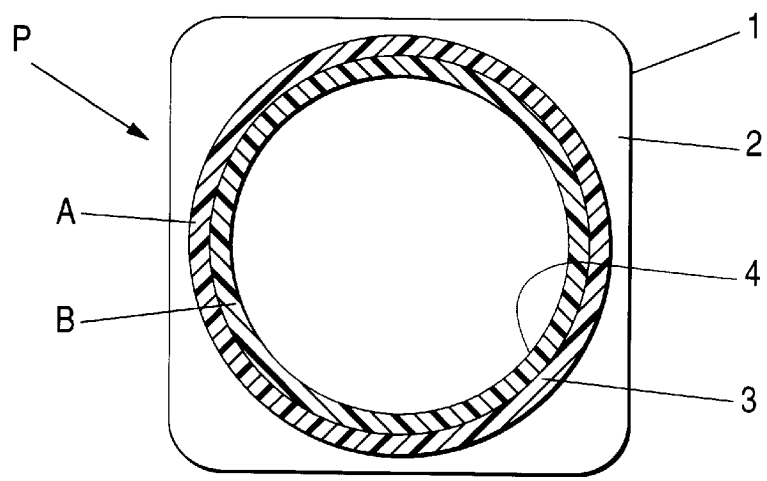
FIG. 4 is a vertical sectional view of a sectionally circular wall portion of the pipe of FIG. 1.

Preferred embodiments of the present invention will now be described with reference to the accompanying drawings. FIGS. 1 to 4 are diagrams illustrating a pipe of a first embodiment. FIG. 1 is a perspective view illustrating the appearance of a pipe P, FIG. 2 shows a shape in which the center portion of a pipe wall 1 is cut in the axial direction of the pipe, and FIG. 3 is a sectional view showing the state where a sectionally rectangular wall portion 2 of the pipe wall 1 is cut in the circumferential direction of the pipe. FIG. 4 is a sectional view showing the state where a sectionally circular wall portion 3 of the pipe wall 1 is cut in the circumferential direction of the pipe.

In this embodiment, the pipe P is formed of two pipes of an outer pipe A and an inner pipe B. As shown in the drawings, the pipe P is configured so that the pipe wall 1 in the outer pipe A is formed by the sectionally rectangular wall portions 2 and the sectionally circular wall portions 3 disposed alternately as the sectional shape of the pipe in the pipe-axial direction. In detail, the corner portions of the sectional shape of each of the sectionally rectangular wall portions 2 are made square while the sectional shape of each of the sectionally circular wall portions 3 are made cylindrical, and they are formed continuously and alternately sequentially. A linear cylindrical inner pipe B the inner surface shape of which is made to be a circular cylindrical surface 4 is welded integrally with the inner surface of the sectionally circular wall portions 3 in the outer pipe A. In carrying out the present invention, the shapes of the sectionally rectangular wall portions 2 and the sectionally circular wall portions 3 according to the present invention are not limited to an annular corrugated shape, but may be a spirally corrugated shape.

In manufacturing the pipe P having such a structure, melted resin is extruded in the form of a tube from a resin extruder arranged on one end of a travelling mold in a pipe molding machine of a well-known travelling mold system. Pressurized air is blown into the tube, or the air is sucked from the mold simultaneously to thereby mold the melted tube sequentially and continuously into an outer pipe A while pressing the tube onto the mold. Then, another melted resin tube is extruded into the inside of the outer pipe A, and a little pressurized air is blown into the inside of the extruded resin tube to keep the shape thereof, and at the same time, to weld the resin tube with the inner surface of the sectionally circular wall portions 3 of the outer pipe A to form an inner pipe B to thereby integrate the inner pipe B with the outer pipe A. Thus, the pipe P is produced.

Figure 5:
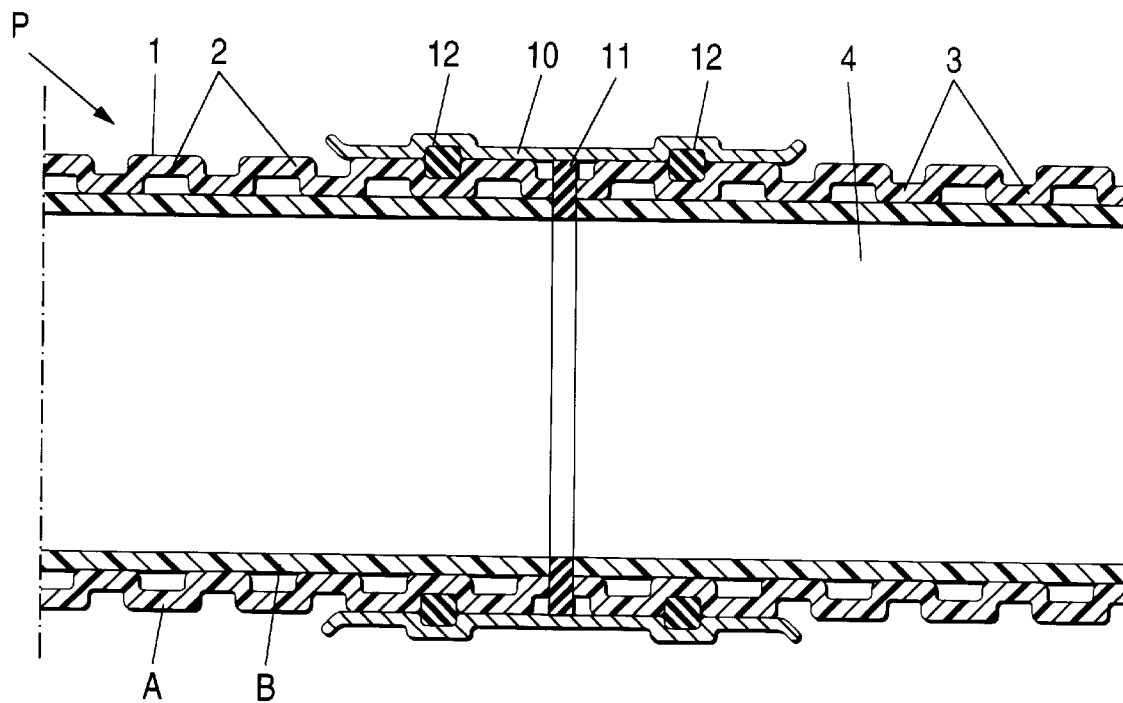
FIG. 5 is a vertical sectional view of a connection portion of the pipe of FIG. 1 in the axial direction of the pipe.

FIG. 5 shows means for connecting the thus produced pipes P and P with each other by use of a pipe joint 10 of resin or metal by way of example. This connecting means is such that packings 12 and 12 are fitted to the sectionally circular wall portions 3 near end portions of the pipes P and P to be connected to each other. Each packing 12 has a circular hole with substantially the same shape as the sectionally circular wall portion 3, and has an external shape which is a square similar to the sectionally rectangular wall portion 2 and which is a little larger than the external shape of the sectionally rectangular wall portion 2. Then, another ring-like sheet packing 11 of foamed material, resin, or rubber to be interposed between the confronted end surfaces of the pipes P and P is inserted into the pipe joint 10 which is shaped in the form of a square tube. Thereafter, the two pipes P and P are pressed into this joint 10 from its opposite sides to be connected to each other.

Figure 6:
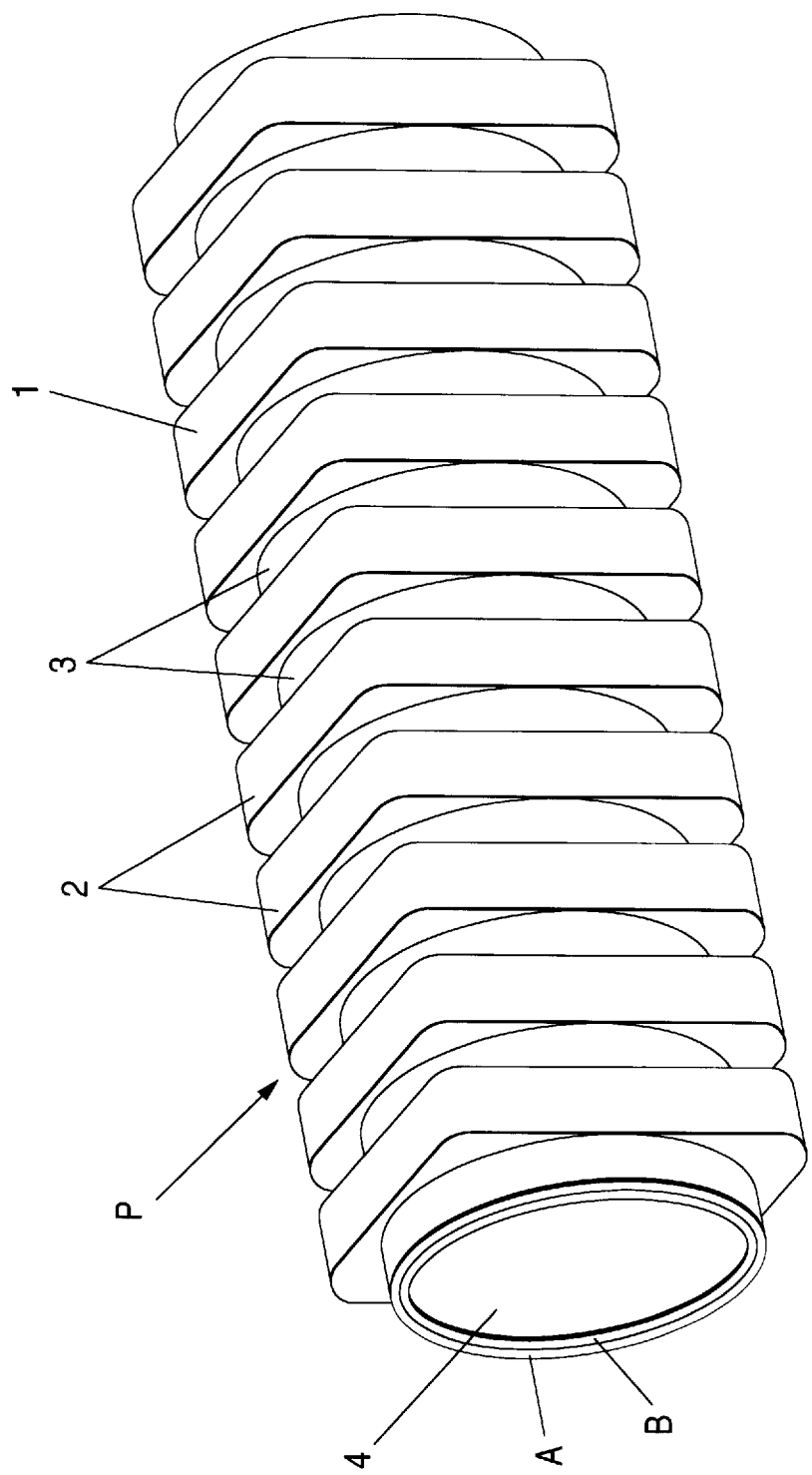
FIG. 6 is a perspective view of a pipe showing a second embodiment.
Figure 7:
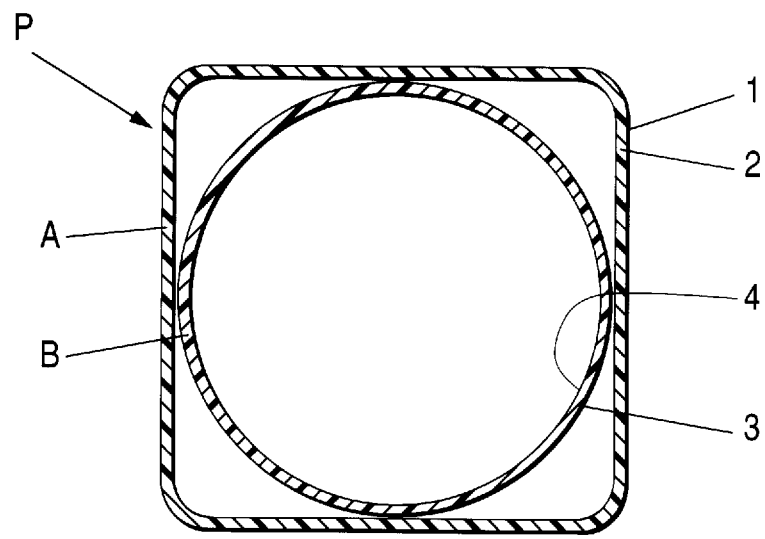
FIG. 7 is a vertical sectional view of a sectionally rectangular wall portion of the pipe of FIG. 6.
Figure 8:
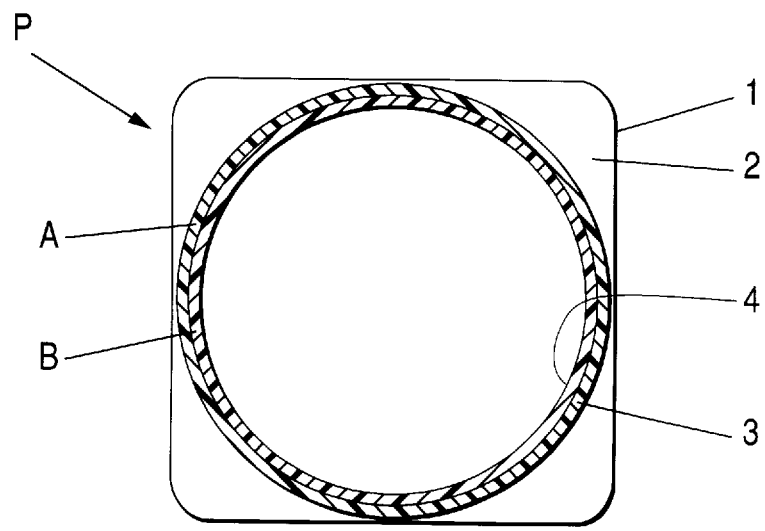
FIG. 8 is a vertical sectional view of a sectionally circular wall portion of the pipe of FIG. 6.

FIGS. 6 to 8 show a pipe P according to a second embodiment. This pipe P is different from the pipe P of the first embodiment in that the outer pipe A and the inner pipe B of the pipe P in this embodiment are formed to be thinner than those shown in the first embodiment, and that the center portions of the respective flat sides 2a . . . of the sectionally rectangular wall portions 2 and the sectionally circular wall portions 3 in the outer pipe A are formed so as to be substantially even to each other both in the inner and outer surfaces of the pipe wall 1. The other points are similar to those in the first embodiment.

Figure 9:
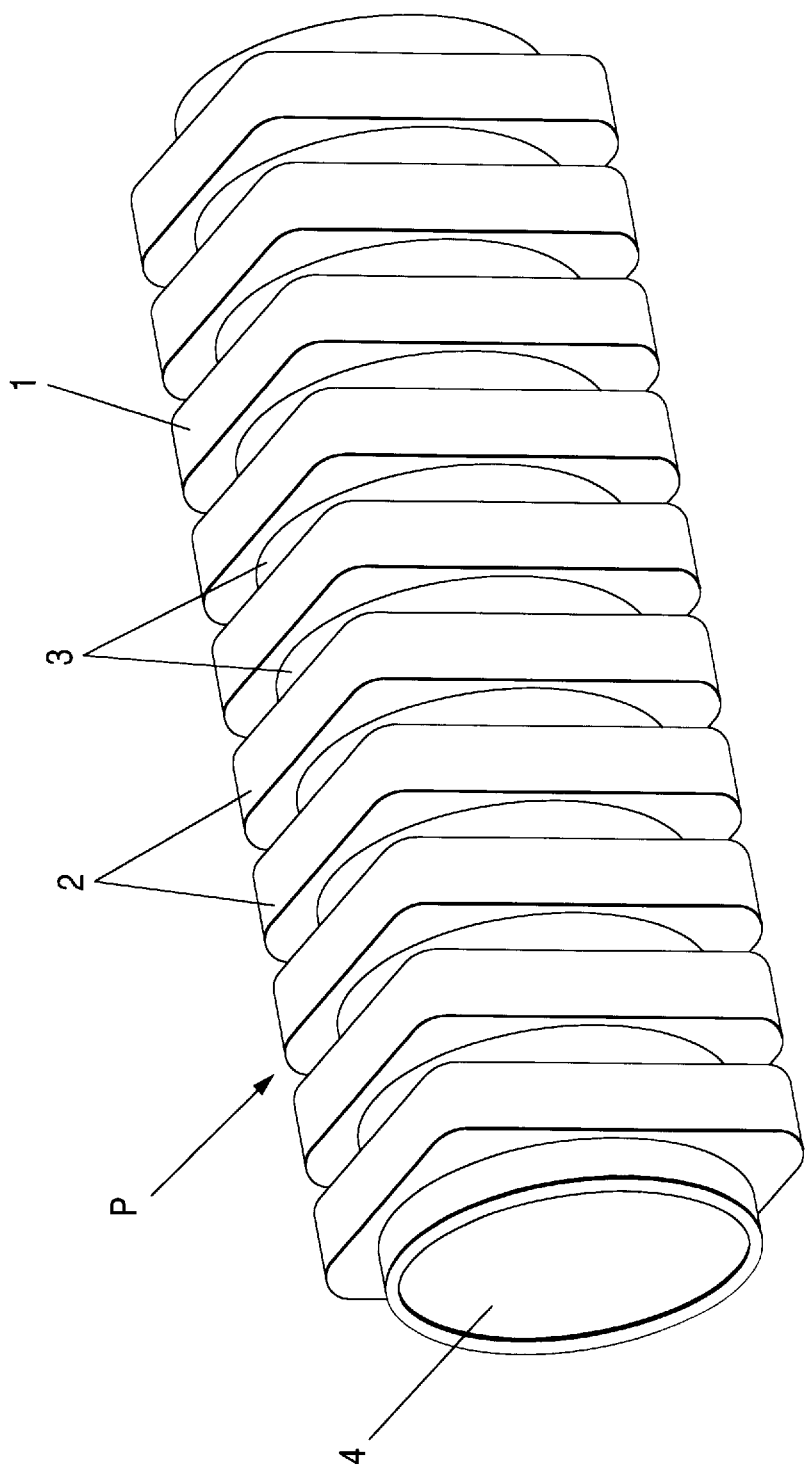
FIG. 9 is a perspective view of a pipe showing a third embodiment.
Figure 10:
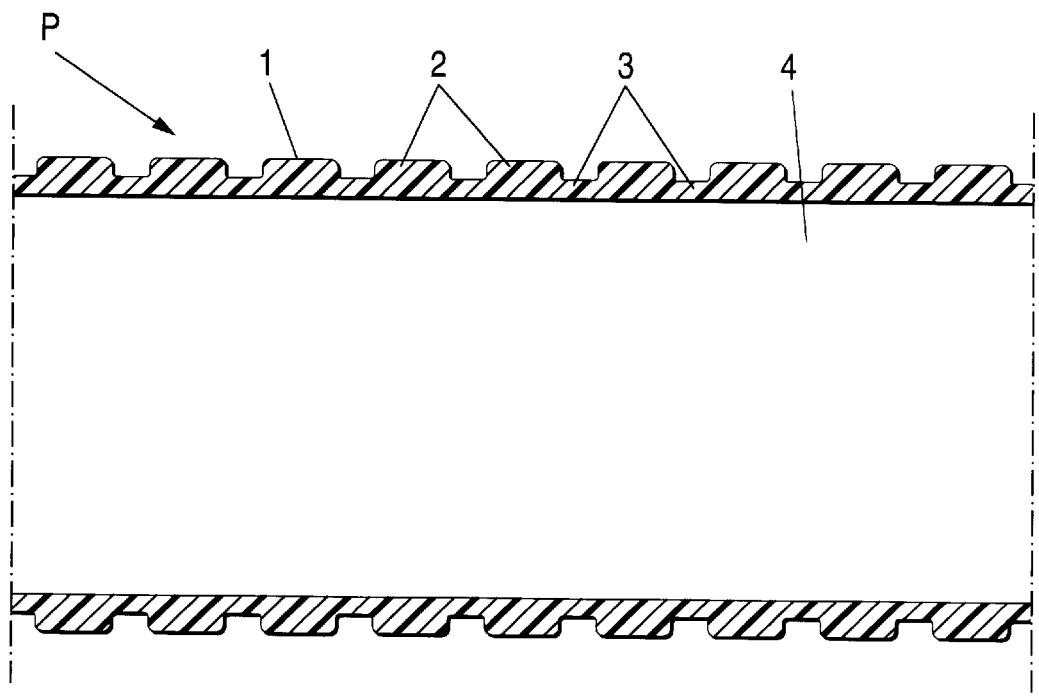
FIG. 10 is a vertical sectional view of the pipe of FIG. 9 along the axial direction thereof.
Figure 11:
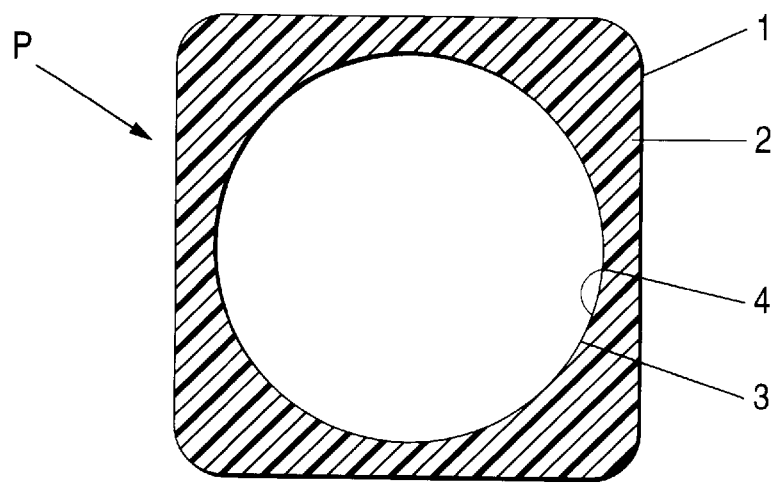
FIG. 11 is a vertical sectional view of a sectionally rectangular wall portion of the pipe of FIG. 9.

The pipe P of a third embodiment shown in FIGS. 9 to 11 is not formed by integrating two pipe bodies, an outer pipe A and an inner pipe B, unlike the first and second embodiments. This pipe P of this embodiment is formed by a single pipe body as a whole. In the pipe P in this embodiment, as shown in FIG. 11 showing a sectionally rectangular wall portion 2 in vertical section, both the sectionally rectangular wall portions 2 and the sectionally circular wall portions 3 in the pipe wall 1 are integrally formed of resin material from its outer circumferential surface to the circular cylindrical surface 4 of its inner circumferential surface. The pipe P according to the present invention can also be carried out with such a structure.

Figure 12:
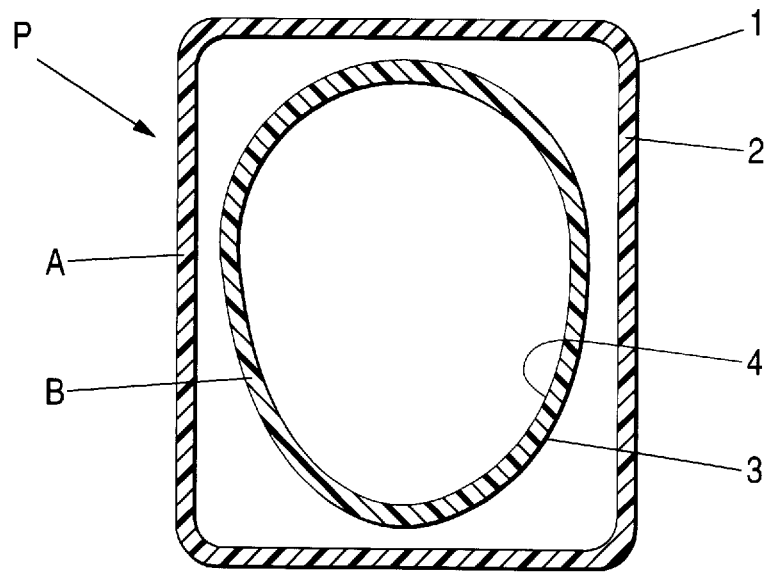
FIG. 12 is a vertical sectional view of a sectionally rectangular wall portion of a pipe showing a fourth embodiment.
Figure 13:
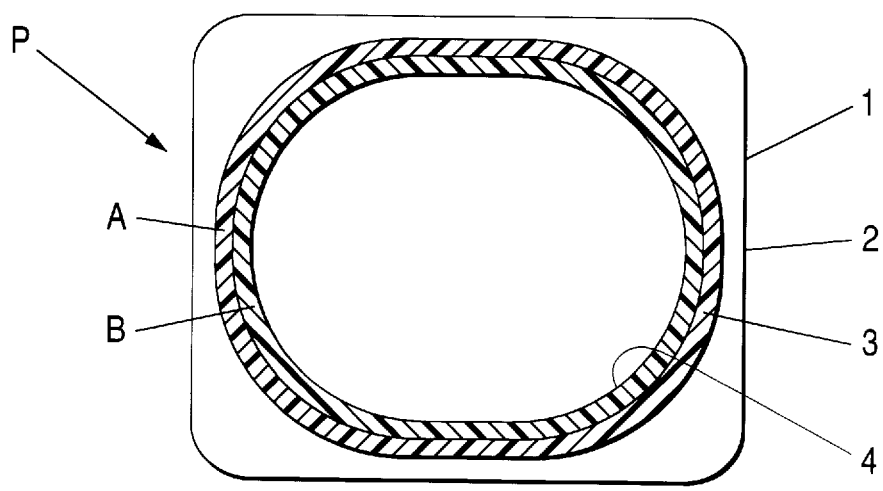
FIG. 13 is a vertical sectional view of a sectionally circular wall portion of a pipe showing a fifth embodiment.

FIGS. 12 and 13 show fourth and fifth embodiments, respectively. In the pipe P in FIG. 12, the sectional shape of each of the sectionally rectangular wall portions 2 is made to be a rectangle which is long vertically while the shape of each of the sectionally circular wall portions 3 and the shape of the inner pipe B are made to be a modified circular shape like an egg. In the pipe P in FIG. 13, the sectional shape of each of the sectionally rectangular wall portions 2 is made to be a rectangle which is long horizontally while the shape of each of the sectionally circular wall portions 3 and the shape of the inner pipe B are made to be an oval which is long horizontally. The pipe P according to the present invention can also be carried out with such a structure.

As for the hardness of synthetic resin material or rubber material forming the pipe P according to the present invention, material having desired hardness may be selectively used in accordance with the size of a pipe to be manufactured, the place where the pipe is used, and so on. However, in the case where the pipe is buried in the ground in use, it is preferable to select the kind, hardness and water resistance of the material, taking the external pressure given to the pipe wall 1 into consideration, so that the material has enough flattening pressure resistance.

Although typical embodiments of the present invention have been described above, the invention is not always limited to the structure of the pipe according to these embodiments, and it can be modified and carried out by suitably changing the structure of the pipe within a scope having the constituents stated in the present invention, attaining the above-mentioned objects of the present invention, and having the following effects.

As is already apparent from the above description, according to the present invention, the external shape of a pipe wall has a structure that sectionally rectangular wall portions and sectionally circular wall portions are disposed alternately in the pipe-axial direction while the internal shape is formed into a substantially linear cylindrical surface, and the whole of the pipe is formed of synthetic resin material or rubber material, so that there are advantages that the pipe can be subjected to piping extremely stably by putting desired flat sides of the sectionally rectangular wall portions on the wall or floor surface in any place where the pipe is subjected to piping, that it is possible to position the pipe easily, and that it is possible to keep the posture of the pipe subjected to piping stably in the state where the pipe does not become out of position easily after the pipe is subjected to piping.

In addition, there is an effect that it is easy to keep a desired number of pipes in parallel with each other when the pipes are subjected to piping in parallel to each other, and that particularly when the pipes are subjected to piping in the ground, it is rare that the linearity or parallelism of the pipes is disturbed by a large quantity of earth and sand entering the space between the pipes, so that it is easy to keep the parallel posture of the pipes.

What is claimed is:

1. A corrugated pipe, comprising:
    a pipe wall having an external shape and an internal shape, said external shape comprising alternating sectionally rectangular wall portions and sectionally circular wall portions, said internal shape comprising a substantially linear circular-cylindrical surface, said pipe wall comprising a material selected from the group consisting of synthetic resin and rubber.

2. A corrugated pipe, comprising:
    an outer pipe having an outer surface comprising alternating sectionally rectangular wall portions and sectionally circular wall portions; and
    an inner pipe having a substantially linear circular-cylindrical inner surface, said inner pipe being positioned inside of said outer pipe and integrally connected to said outer pipe, said corrugated pipe comprising a material selected from the group consisting of synthetic resin and rubber.

3. A corrugated pipe comprising:
    a pipe wall having an external shape and an internal shape, said external shape comprising alternating sectionally rectangular wall portions and sectionally circular wall portions, said internal shape comprising a substantially linear circular-cylindrical surface, said pipe wall comprising a material selected from the group consisting of synthetic resin and rubber,
    wherein each of said sectionally rectangular wall portions has a square sectional shape with arcuate corners.

4. A corrugated pipe as claimed in claim 1, wherein an outer circumferential diameter of each of said sectionally circular wall portions is less than that of said sectionally rectangular wall portions.

5. A corrugated pipe as claimed in claim 2, wherein each of said sectionally rectangular wall portions includes at least one flat inner side and each of said sectionally circular wall portions includes an inner circumferential surface, wherein said at least one flat inner side of one of said sectionally rectangular wall portions is substantially even to said inner circumferential surface of an adjacent one of said sectionally circular wall portions.

6. A corrugated pipe as in claim 1, wherein said pipe wall comprises a single, monolithic structure.

7. A corrugated pipe as in claim 1, wherein said substantially linear circular-cylindrical surface of said internal surface comprises one of an ellipse and an oval in cross-section.

8. A corrugated pipe as in claim 1, wherein said pipe wall has a thickness, in a direction perpendicular to an axial direction of said pipe, which is greater at said sectionally rectangular wall portions than at said sectionally circular wall portions.

9. A corrugated pipe as in claim 1, wherein each of said sectionally rectangular wall portions has a length in a first direction parallel to an axial direction of said pipe and each of said sectionally circular wall portions has said length in said first direction.

10. A corrugated pipe as in claim 1, wherein said substantially linear circular-cylindrical surface comprises a continuous, smooth unbroken surface.

11. A corrugated pipe as in claim 1, wherein said pipe comprises one of an annularly corrugated pipe and a spirally corrugated pipe.

12. A corrugated pipe as in claim 1, wherein said pipe comprises a plurality of sections joined by connectors, wherein each of said connectors comprises:
    a joint contacting said sectionally rectangular wall portions of adjacent ones of said sections;
    packings positioned between said sectionally circular wall portions and said joint; and
    a ring positioned between confronting ends of said adjacent ones of said sections.

13. A corrugated pipe as in claim 1, wherein a length of the sectionally rectangular wall portions is substantially the same as a length of the sectionally circular wall portions.

14. A corrugated pipe as in claim 1, wherein a length of the sectionally rectangular wall portions is not smaller than a length of the sectionally circular wall portions.

15. A corrugated pipe as in claim 2, wherein each of said sectionally rectangular wall portions has a square sectional shape with arcuate corners.

16. A corrugated pipe as in claim 2, wherein said inner pipe has a substantially linear circular-cylindrical outer surface.

17. A corrugated pipe as in claim 2, wherein said substantially linear circular-cylindrical surface of said inner surface of said inner pipe comprises one of an ellipse and an oval in cross-section.

18. A corrugated pipe as in claim 2, wherein said outer pipe has a thickness in a first direction perpendicular to an axial direction of said corrugated pipe and said inner pipe has said thickness in said first direction.

19. A corrugated pipe as in claim 2, wherein each of said sectionally rectangular wall portions of said outer pipe has a length in a first direction parallel to an axial direction of said pipe and each of said sectionally circular wall portions of said outer pipe has said length in said first direction.

20. A corrugated pipe as in claim 2, wherein said pipe comprises one of an annularly corrugated pipe and a spirally corrugated pipe.

21. A corrugated pipe as in claim 2, wherein said pipe comprises a plurality of sections joined by connectors, wherein each of said connectors comprises:
    a joint contacting said sectionally rectangular wall portions of said outer pipe of adjacent ones of said sections;

packings positioned between said sectionally circular wall portions of said outer pipe and said joint; and a ring positioned between confronting ends of said adjacent ones of said sections.

22. A corrugated pipe as in claim 2, wherein said sectionally rectangular wall portions of said outer pipe have an inner surface and said inner pipe has an outer surface connected only to said inner surface of said sectionally rectangular wall portions.

23. A corrugated pipe as in claim 2, wherein a length of the sectionally rectangular wall portions is substantially the same as a length of the sectionally circular wall portions.

24. A corrugated pipe as in claim 2, wherein a length of the sectionally rectangular wall portions is not smaller than a length of the sectionally circular wall portions.

* * * * *